(12) United States Patent
Niles et al.

(10) Patent No.: US 8,610,932 B2
(45) Date of Patent: Dec. 17, 2013

(54) JOB BASED CALIBRATION, CALIBRATION GUARD, AND PROFILE ADVISOR

(75) Inventors: Michael Niles, Belmont, CA (US); Paul Michel, Redwood City, CA (US); David Lee, San Francisco, CA (US); Jorge Juliao, San Ramon, CA (US)

(73) Assignee: Electronics for Imaging, Inc., Foster City, CA (US)

( * ) Notice: Subject to any disclaimer, the term of this patent is extended or adjusted under 35 U.S.C. 154(b) by 308 days.

(21) Appl. No.: 13/014,620

(22) Filed: Jan. 26, 2011

(65) Prior Publication Data

US 2012/0188596 A1    Jul. 26, 2012

(51) Int. Cl.
*G06F 3/12*    (2006.01)
(52) U.S. Cl.
USPC ........... 358/1.15; 358/406; 358/504; 358/518
(58) Field of Classification Search
USPC ......... 358/1.15, 1.8, 1.9, 1.18, 406, 504, 518; 399/15
See application file for complete search history.

(56) References Cited

U.S. PATENT DOCUMENTS

| 2002/0051180 | A1* | 5/2002 | Shimbori et al. | 358/1.15 |
| 2004/0207862 | A1* | 10/2004 | Such et al. | 358/1.9 |
| 2005/0141057 | A1* | 6/2005 | Kumada et al. | 358/504 |
| 2005/0248787 | A1 | 11/2005 | Aschenbrenner et al. | |
| 2009/0122348 | A1* | 5/2009 | Sato | 358/1.18 |
| 2009/0213414 | A1* | 8/2009 | Braverman et al. | 358/1.15 |
| 2010/0277753 | A1 | 11/2010 | Shinchi | |
| 2011/0280589 | A1* | 11/2011 | Chandu et al. | 399/15 |

* cited by examiner

*Primary Examiner* — King Poon
*Assistant Examiner* — David S Cammack
(74) *Attorney, Agent, or Firm* — Michael A. Glenn; Perkins Coie LLP

(57) ABSTRACT

A method and apparatus for launching a calibrator process by which the user is guided through the process of calibrating the conditions used by a particular print job is provided. Techniques are provided which calculate which print conditions will be used by the particular print job, which guarantees that the user is calibrating the correct conditions to get the best color quality for the particular job. The method and apparatus further provides techniques that allow the user to specify the conditions under which a calibration is considered expired in terms of time since the last calibration and the number of prints since the last calibration The method and apparatus further provides techniques for when the user encounters a new media type or print condition, the system can measure such and inform the user whether to create a new profile and/or new calibration set to get the optimal color quality.

4 Claims, 14 Drawing Sheets

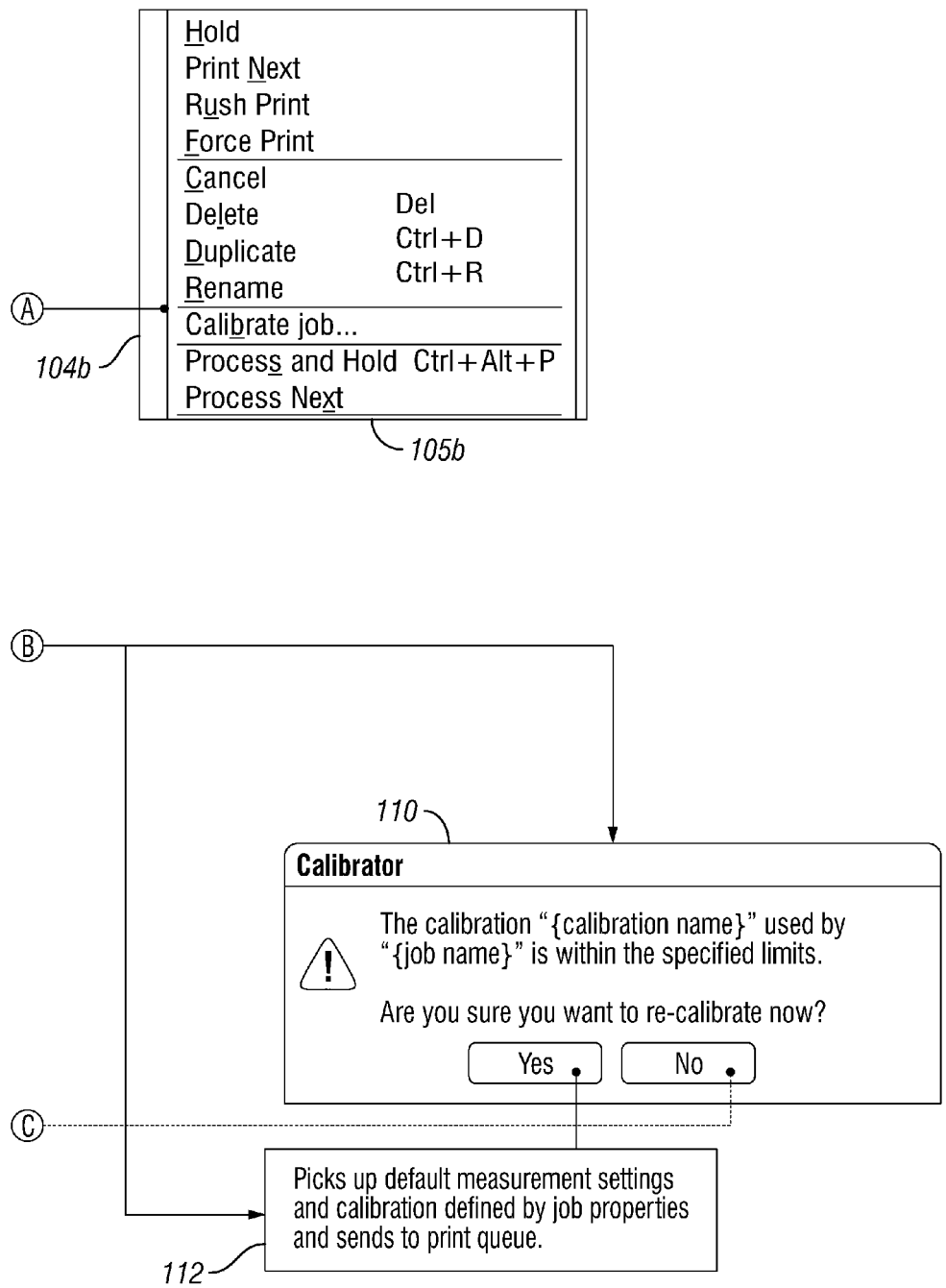
FIG. 1B (Con't)

| Calibrator | | | |
|---|---|---|---|
| Media setting | Last used | Last calibrated | Status |
| ☑ Xerox CX | 03/02/2009 2:15PM | 03/02/2009 9:32AM | ● |
| ☑ Xerox CX 150 dot | 02/38/2009 9:37PM | 03/02/2009 12:22PM | ◐ |
| ☐ Xerox CX 175 dot | 02/28/2009 4:50PM | 03/01/2009 12:40PM | ◐ |
| ☐ Xerox CX 200 dot | Never | 05/11/2008 6:01PM | ○ |
| ☐ Xerox Graph Xpress | 05/11/2008 6:35PM | Factory | ○ |
| ☐ Xerox DC Select G | 11/11/2008 3:42PM | 11/11/2008 12:20PM | ○ |
| ☐ Xerox DC Select G 200 | 11/11/2008 12:13PM | 11/11/2008 11:48AM | ○ |

Comments:
{Comments for selected calibration...}

Associated media:
Navigator 28

Properties:
{List of color-affecting property settings}

[Properties]

[Continue] [Cancel]

(*Sortable headers*)
All headers are sortable. Default sort by status (Media groups should remain as a group) Use the default media for the sortable values.)

(*Media group*)
(When a media needs more than one setting configuration, a media group is created. The media group has a default media and each media variation is displayed below the default media.)

FIG. 4

| # | Job Status | Job Title | User | Size | Pages | Copies | Paper Type | Paper Size |
|---|---|---|---|---|---|---|---|---|
| 1 | printing suspended | ⚠ colorchart_fre.ps | antonyp | 0.1 MB | 3 | 1 | | Tabloid |

Printing: [Cancel]

*FIG. 5*

*(Setting calibration status limits*
Setting up limits alerts users to the "freshness" state of their calibrations. Limits are passively displayed in job center and job properties per job.
Selecting "Suspend printing when printer exceeds set limits" will result in a job error when set limits are exceeded)

(Default setting for calibration status is unchecked)

- ☐ Enable calibration status ?
  - Set calibration limits:
    - ☐ [    ] [         ⌄]
    - ☐ [    ] Impressions
  - ☐ Suspend printing when printer exceeds set limits
  - ☐ Show warning when calibrating a job that is within set limits?

— 602

*(Checking the calibration status box*
Enabling the calibration status box will activate the controls for setting the limits. The default setting is 24 hours. The calibration status can also be set using number of impressions setting. There is no default value for impressions. Suspend printing control is also active when at least one of the calibration limits boxes are checked. If both boxes are unchecked, the Suspend printing control is grayed out.)

(Default setting for calibration status is unchecked.)

- ☑ Enable calibration status ?
  - Set calibration limits:
    - 610 — ☑ [24] [Hour(s) ⌄] — Ⓐ
    - 612 — ☑ [1000] Impressions
  - ☐ Suspend printing when printer exceeds set limits
  - ☐ Show warning when calibrating a job that is within set limits ?

*(Display calibration information (no limit set))*
(When no limit is set for calibration status, the default display is the age of the calibration.)

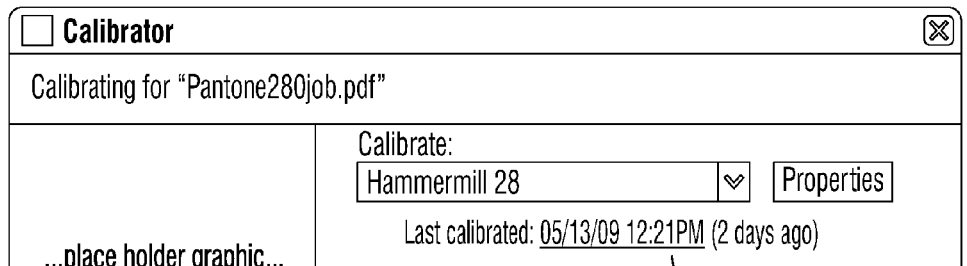

*Calibration information display without a calibration limit set*
Calibration information displays as age only when no calibration limit is set.
Time is displayed as time elapsed. Rules for display are as follows:
0-60 minutes:"{*n*} minute(s) ago"
1-24 hours:"{*n*} hour(s) ago"
1-7 days:"{*n*} day(s) ago"
8-365 days:"{*n*} week(s) ago"
366-~ days:"{*n*} year(s) ago"

―604

*(Display calibration information (limit set))*
(When limit is set for calibration status, the information displayed is the status icon and the age of the calibration.)

―608

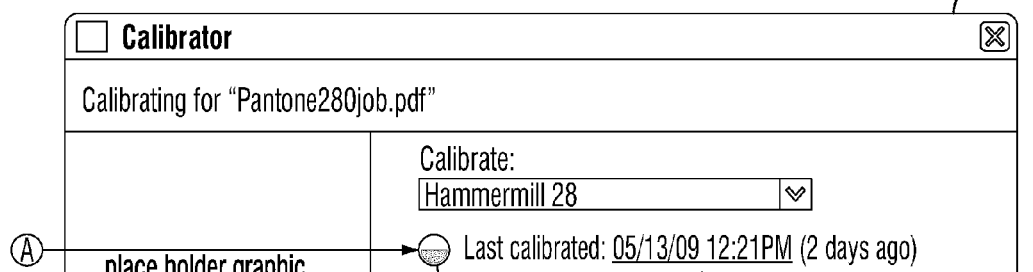

*Calibration states*
The calibration status is the current state of the age of the last calibration measurement vs. the defined limit of time or number of impressions specified by the user. If the status represents more than one media/calibration (i.e status for a job that uses more than one calibration), use the oldest value for representation. The calibration status is displayed as an icon that has 3 states of calibration status:

◉ Less than half of time/impression count has passed —618a
    ◐ More than half of time/impression count has passed —618b
    ○ Time/impression count has been reached or surpassed —618c

}618

FIG. 6 (Con't)

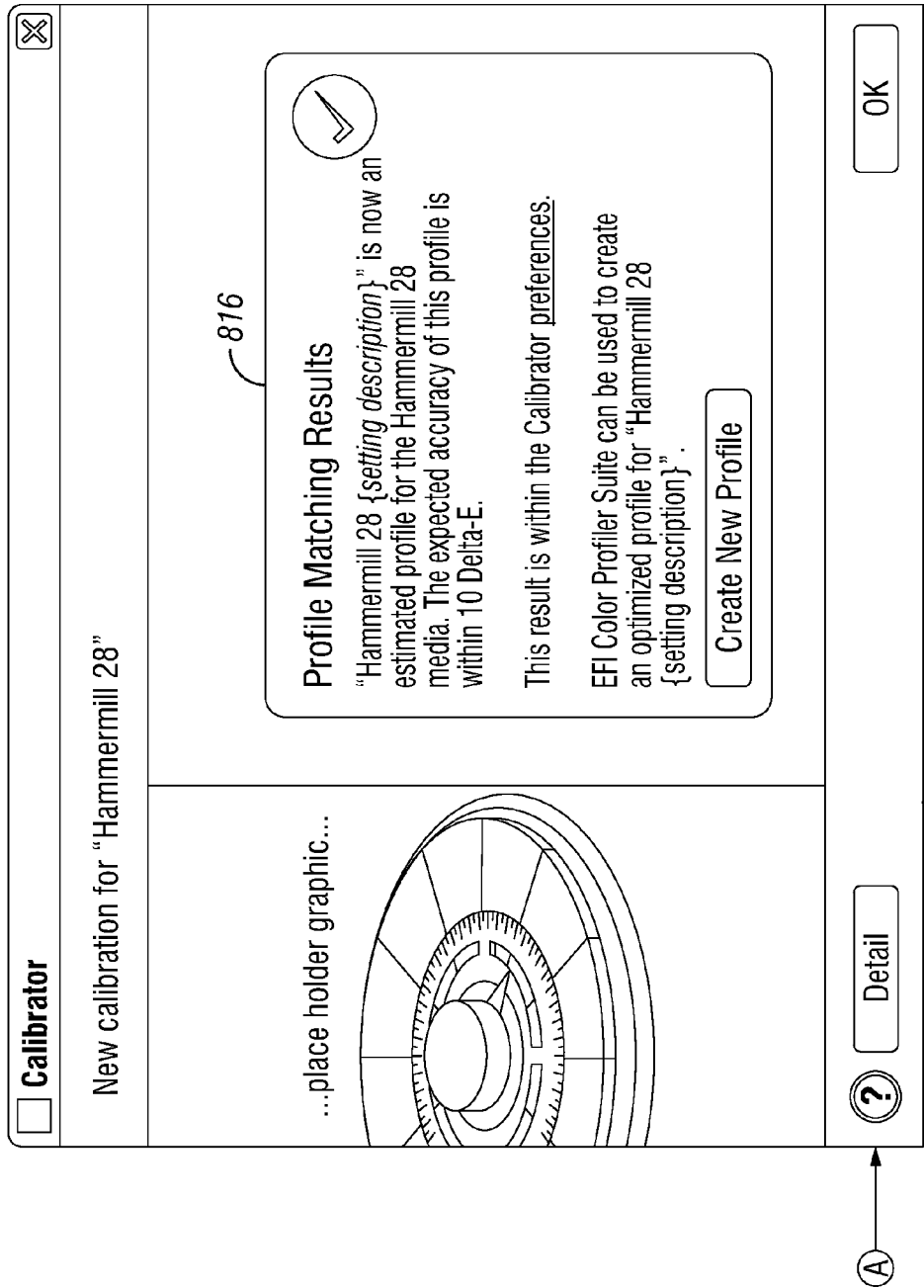
FIG. 8 (Con't)

JOB BASED CALIBRATION, CALIBRATION GUARD, AND PROFILE ADVISOR

BACKGROUND OF THE INVENTION

1. Technical Field

The invention relates generally to the field of digital printing. More specifically, the invention relates to determining calibration values and color profile data as they pertain to digital printers.

2. Description of the Related Art

Color management is the art and science of managing devices and their output such that users experience consistency in color output. For example, a user may want to print an image on glossy paper and then print the same image on a newspaper. It isn't difficult to imagine that the resulting colors of the image on each respective type of paper would appear very different to the eye. A yellow sun and a blue sky rendered on the glossy paper one would imagine would be bright and cheerful. The same yellow sun and same blue sky rendered on a piece of newspaper one would imagine being rather dull and lifeless.

In another example, a user may print the image mentioned above on a particular printer and on glossy paper a day apart. One skilled in the art can imagine that the rendered colors yellow and blue on the first day may look different from the rendered colors on the second day As an example, the printer may print less cyan on Day 2. For a print of an image that includes a sky, the color of the sky may be different and lighter than when printing the same image on Day 1. Thus, given the same materials but over a lapse of time, the user may again experience inconsistency in rendered colors.

Achieving consistent digital printer output may be of great value to particular industries that depend on digital graphics at some stage of their business. For example, advertising agencies can suffer great losses if they do not deliver products with the colors that their clients expected. Graphic artists may end up throwing away expensive brochures if the colors on the first printed brochure are visibly different from the "same" colors on the last printed brochure.

Thus, color management has become its own industry with researchers and practitioners working at improving techniques within the industry for the benefit of the providers and the consumers.

Two particular aspects of color management in regard to digital printers are printer calibration and color profiles stored on the printers. Calibration is the process by which colors that are produced by a particular printer are adjusted according to particular references of colors for that particular printer. For example, it has been found that the printed colors from a particular printer drift over time. Thus, calibration is a process that compensates for printer drift over time in order to reach a known color reference. For example, after a particular period of time, one skilled in the art knows to calibrate the printer so that the expected color output is again achieved. As another example, consumers of printer cartridges for home printers know to calibrate the printer after they have just installed a new ink cartridge.

Color profiles are data that take into account the particular printer, the color settings, and the type of media, e.g. paper, used. More particularly, color profiles are International Color Consortium (ICC) color profiles. An ICC profile is a set of data that characterizes a color output device, according to standards published by the ICC. The color output varies with different media types and halftones.

In the example above about printing the image with the yellow sun and blue sky on glossy paper and on newspaper, using color profiles can ensure that the output of the colors look the same to the human eye. One profile sets the color output or signal to the printer for glossy paper and another profile sets the color output or signal to the printer for the newspaper.

More particularly, color profiles are used to do color conversion. For example to convert an image from RGB to CMYK so that the image can be printed on a particular printer, two ICC profiles are needed: the RGB profile and the printer CMYK profile. To perform the conversion, each RGB triplet is first converted to the profile connection space (PCS) using the RGB profile. Then the PCS is converted to the four values of CMYK required. The conversion from PCS to CMYK varies depending on the media type used in the printer and the halftone used to make the print.

SUMMARY OF THE INVENTION

A method and apparatus for launching a calibrator process by which the user is guided through the process of calibrating the conditions used by a particular print job is provided. Techniques are provided which calculate which print conditions will be used by the particular print job, which guarantees that the user is calibrating the correct conditions to get the best color quality for the particular job. The method and apparatus further provides techniques that allow the user to specify the conditions under which a calibration is considered expired in terms of time since the last calibration and the number of prints since the last calibration The method and apparatus further provides techniques for when the user encounters a new media type or print condition, the system can measure such and inform the user whether to create a new profile and/or new calibration set to get the optimal color quality.

BRIEF DESCRIPTION OF DRAWINGS

FIG. 4 is a screen shot of a sample UI window, according to an embodiment;

FIG. 5 is a screen shot of a sample notification message box, which notifies the user that printing the print job has been suspended, according to an embodiment;

FIG. 6 is a schematic diagram showing two sets of two UI windows each, in which the first window allows a user to set calibration limits and the second window displays the resulting calibration information, according to an embodiment;

DETAILED DESCRIPTION OF THE INVENTION

Figure 1A:
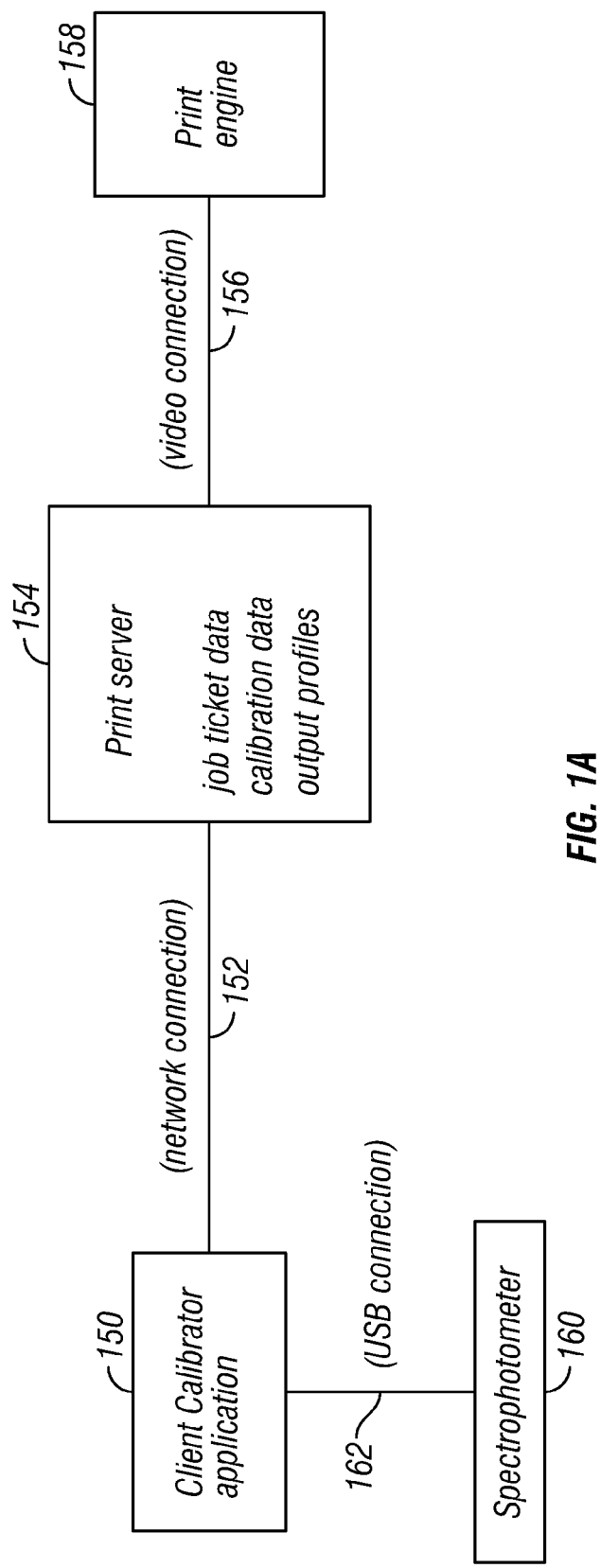
FIG. 1A is a schematic diagram of a high level system architecture, according to an embodiment.

A method and apparatus for launching a calibrator process by which the user is guided through the process of calibrating the conditions used by a particular print job is provided. Techniques are provided which calculate which print conditions will be used by the particular print job, which guarantees that the user is calibrating the correct conditions to get the best color quality for the particular job. The method and apparatus further provides techniques that allow the user to specify the conditions under which a calibration is considered expired in terms of time since the last calibration and the number of prints since the last calibration The method and apparatus further provides techniques for when the user encounters a new media type or print condition, the system can measure such and inform the user whether to create a new profile and/or new calibration set to get the optimal color quality.

Overview

Print operators calibrate various print conditions, e.g. due to different media and halftones, of a printer by printing color patches, measuring them with a color-measuring instrument, and saving this data on a print server (e.g., a standalone, embedded or virtual print server or controller implemented in software or hardware or a combination thereof). One or more processes on the print server uses such saved data and then make corrections to the Cyan-Magenta-Yellow-black (CMYK) raster data sent to the printer to achieve consistent color print output. However, it may not be obvious or known by the print server which conditions, e.g. type of paper, are used by which print jobs when there are multiple possible print conditions. A print job herein is considered the actual content that is to be printed.

A typical scenario is as follows. Users, e.g. print operators, may print jobs using calibration data that have expired, e.g., the engine state has changed significantly since the system was last calibrated or other conditions may have changed. The print operator is not warned about this situation. As a result, the printed output may have reduced color quality and may need to be thrown away.

To ensure the highest color quality, the print operator may consider creating an ICC color profile for every new media type and print condition. However, such profiling may be wasted effort if such profiling isn't required. For example, the color produced by two different media may be similar enough. The definition of "similar enough" is largely subjective, but can also be measured as the delta E of the colors printed on the two media.

It has been found that, currently, a user may not be sure which print conditions need to be calibrated for a particular job. For example, there are many more combinations of print conditions than practical to maintain as calibrations. For instance, six media types with six different halftones result in 6×6=36 combinations, but may require only three calibrations because some media types and halftones are substantially similar. The mapping of the 36 combinations to the three calibrations may not be obvious to the user.

As well, a user may calibrate the wrong conditions. An example for calibrating the wrong condition is as follows. The user calibrates the "Glossy Coated" calibration, but then prints their job on Plain paper, which uses the "Plain" calibration. Calibrating for "Glossy Coated" has no effect on jobs that use the "Plain" calibration.

Further, a user may end up wasting effort calibrating an unused condition. An example for an unused condition is when there is no output profile that uses the calibration which was done by the user. The user calibrates a print condition, but this print condition will not be used when the job prints. For example, the user calibrates the "Glossy Coated" calibration, but there are no output profiles on the server that use the "Glossy Coated" calibration. Moreover, such calibration may result in the user's job not printing with the best color quality.

It may be possible for the user to print jobs with invalid calibration data, resulting in reduced color quality and also potentially wasting paper and toner when the result is unsatisfactory. For an example for printing with invalid calibration data, it should be understood that calibration data must be routinely updated, for example but by no means limited to once per day, so that such calibration data stay accurate. Calibration data that are too old may be considered invalid. Thus, as an example, assume the user last calibrated "Plain Paper" six months ago and then prints using "Plain Paper" today. In this example, such calibration data are probably no longer accurate and the color quality may be poor.

As well, it may be difficult for a user to determine how well an existing color profile and calibration measurements perform for a new media and/or a new print condition. For example, suppose the user has an output profile and calibration measurements for a specific media: Hammermill 24 lb. Plain Paper. The user wants to print on a slightly different media: Hammermill 32 lb. Plain Paper. It may be difficult for the user to determine how well the 24 lb. profile and calibration measurements will work with the 32 lb. paper. It may be that the color quality is sufficient with the 24 lb. profile and calibration measurements, or it may not be good enough, in which case the user needs to use separate calibration measurements and/or create an output profile specific to the 32 lb. media.

It may also be difficult for a user to make an intelligent or informed decision about whether to invest the time and effort to create a new profile and/or calibration set. The user may need to use calibration software, e.g. but not limited to the Fiery® calibrator software by Electronic for Imaging, Inc., Foster City, Calif., ("EFI") to create a new calibration. This process involves creating a new calibration entry in the software, printing the calibration patches on the new media, measuring these calibration patches with a spectophotometer, and saving the calibration measurement data. This process usually takes approximately one hour. In addition to creating a new calibration, the user may also need to create a new output profile. This process involves calibrating the new media (the steps previously described), plus printing profiling patches, measuring the profiling patches, and using the various color controls in the profile creation software to get good results. This usually takes a minimum of one hour, but may take many hours to get good results by trying different color controls in the profile creation software, or different profile patch layouts.

Thus, embodiments of techniques are described hereinbelow that address the situations described above, in which a typical user, such as a print operator, may find oneself.

Job-Based Calibration

An embodiment can be understood with reference to FIG. 1A, a schematic diagram showing components and their relationships, according to an embodiment. This embodiment provides a print server 154 that is communicatively connected to a print engine 158. By way of example only, printer server 154 is communicatively connected to print engine 158 by a video connection 156. Print server 154 has stored thereon, in volatile or non-volatile memory, calibration data and output profiles, by way of example only. It should be appreciated that print server 154 could also be communicatively connected to a storage (not shown) and may store data thereon as well. As well, print server 154 is communicatively connected to a client calibrator application 150 on a client device (not shown). It should be appreciated that where client calibration application 150 resides is by design. For example, client calibrator application 150 may be stored on print server 154 and still be within the scope of the invention. In the figure, and by way of example only, client calibrator application 150 is communicatively connected to printer server 154 by way on a network connection 152. As well, client calibrator application 150 is communicatively connected, e.g. by way of a USB connection 162, to a spectrophotometer 160. Further details about the interactions of the foregoing components are described hereinbelow.

Figure 1B:
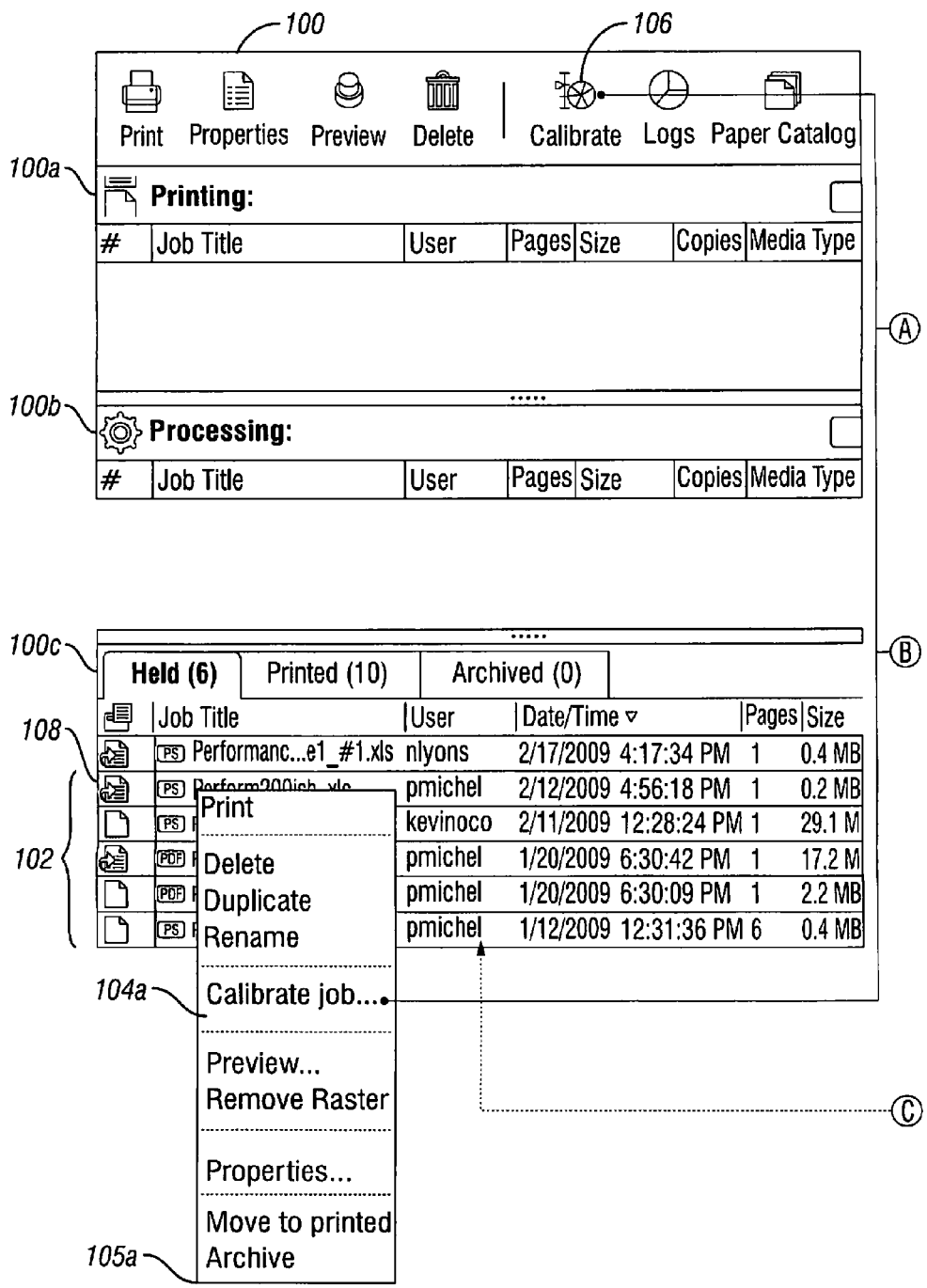
FIG. 1B is a sample screen shot of an interface to a job-based calibration application, according to an embodiment.

An embodiment can be understood with reference to FIG. 1B. FIG. 1B is a sample screen shot 100 of an interface to client calibrator application 150. At a high level, the user, e.g. print operator, selects a print job 108, right-clicks and selects "Calibrate job . . . " 104a. A calibrating sub-application is launched by which the user is guided through the process of calibrating the particular conditions by print job 108. More specifically, the print server 154 computes which print conditions are to be used by print job 108. An example of computing print conditions for a job is as follows. Suppose a particular 100-page job uses heavy card stock for the front and back covers, glossy coated paper for page 50, and plain paper for all other pages. For this example, print server 154 has a total of six calibrations available: plain paper, glossy coated paper, heavy card stock, high quality paper, thick paper, and rough paper. This particular 100-page job does not use all six calibrations. Such job only uses the calibrations that correspond to the media used in the job. In this example, based on the media selections chosen for the job, print server 154 computes that this 100-page job uses three calibrations: plain paper, glossy coated paper, and heavy card stock. When the job is printed, print server 154 uses calibration data from these three calibrations. The result of such computation effectively guarantees that the user is calibrating the correct conditions to achieve optimal color quality for the particular job.

Referring to FIG. 1B, sample screen shot 100 contains a menu that includes a Calibrate menu item 106. Sample screen shot 100 also displays three tiers of information: Printing 100a, Processing 100b, and information organized into three tabs 100c. Three tabs 100c in this sample are labeled: Held (6), Printed (10), and Archived (0). Held (6) tab is selected, thus showing a list of six print jobs 102 residing on print server 154. In sample screen shot 100, the second print job 108 has been selected and is highlighted. Further, sample screen shot 100 shows the result of a user having selected the option to calibrate the print job. That is, for example, the user may have right-clicked the mouse over highlighted print job 108, which resulted in the pop-up menu 105a being displayed. Alternatively, the user may have selected menu item 106, which resulted in a similar pop-up menu 105b being displayed. On pop-up menu 105a, the user may select menu item 104a, Calibrate job. Similarly, on pop-up menu 105b, the user may select the menu item 104b, Calibrate job. Once menu item 104a or 104b are selected, when no calibration has been previously performed or when by design, as described in box 112, the client calibrator application 150 picks up default measurement settings to be used by the forthcoming calibration process. The measurement settings are picked up from the job and used to print the calibration patches. For example, a particular job prints on Coated paper, with a "200 dot" halftone screen, and glossy mode on. When the user calibrates for this particular job, the calibration patch page is printed with these same settings. As well, the calibration used by this job is also calculated by print server 154. For example, these print settings may correspond to a calibration called "Coated 200 dot with Glossy mode on". When the user measures the calibration patches, the data is saved on print server 154 in this calibration.

As well, the forthcoming calibration process is further defined by the job properties of print job 108, such as type of halftone, type of paper, and so forth. The client calibrator application 150 then sends print job 108, as well as the default measurement settings and any further calibration data defined by the job properties to the print queue.

When client calibrator application 150 detects that a calibration has been performed that may apply to print job 108 or based on other information, client calibrator application 150 may cause a message box 110 to be displayed to the user, where message box 110 conveys that the forthcoming calibration process may be within limits of a previously performed calibration and that recalibration may not be necessary. For example, suppose there are five jobs in a print queue and all five print jobs use the same calibration. Suppose further that a calibration was performed for the first print job of the five print jobs. Then, it would not be necessary to perform any further calibrations for the remaining four print jobs. In an embodiment, client calibrator application 150 detects such situation and displays message box 110, which asks the user whether the user is sure that he or she wants to calibrate the instant print job, such as the second print job. Thus, the user can select the "No" pushbutton and bypass the calibration process. In this way, the user saves the time it takes to calibrate.

Figure 2A:
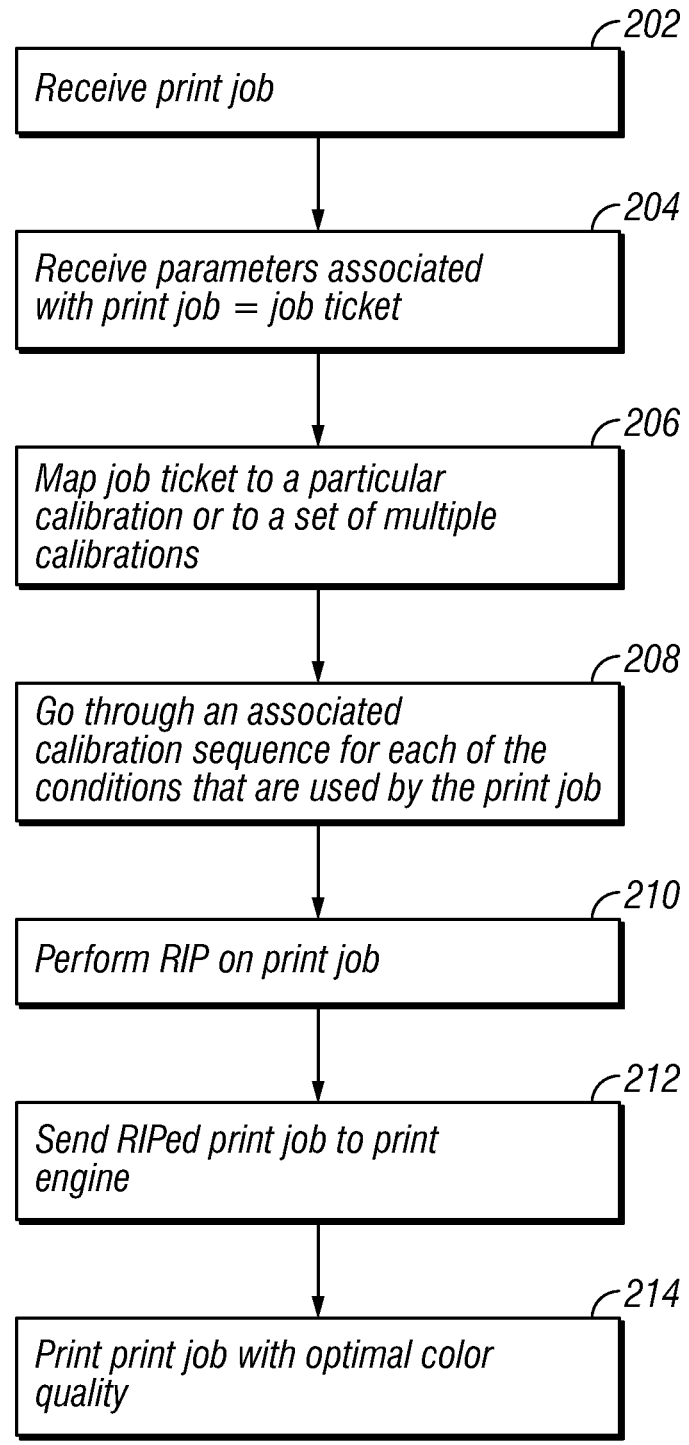
FIG. 2A is a flow diagram of a process flow for job-based calibration, according to an embodiment.

An embodiment of a process flow can be described with reference to the flow diagram of FIG. 2A. At step 202, print server 154 receives a print job. Along with the print job, print server 154 receives particular information that is associated with the print job. For example, the information received is that the print job is to be printed on particular media or for halftone, and the like. In an embodiment, such information is received by print server 154 as one or more parameters, as shown in step 204. The collection of the one or more parameters that is associated with a print job is referred to herein as a "job ticket" for the particular print job. Once print server 154 has received the particular print job and has the associated job ticket, print server 154 maps the job ticket to a particular calibration or to a set of multiple calibrations, as shown in step 206.

In an embodiment, some of the settings that affect this mapping are: (1) the media types specified to be used in the job, (2) whether the user has specified to use a single output profile or to use different output profiles for different media types in the job, (3) whether the user has turned off color processing, e.g. the "ColorWise Off" setting, (4) print server's 154 settings for associating calibration sets to output profiles, (5) whether the job uses paper catalog entries as media types, and if so, if any output profiles are specified for the paper catalog entries, and (6) on some systems, other job settings that affect calibration selection, such as halftone screen and glossy mode.

Figure 2B:
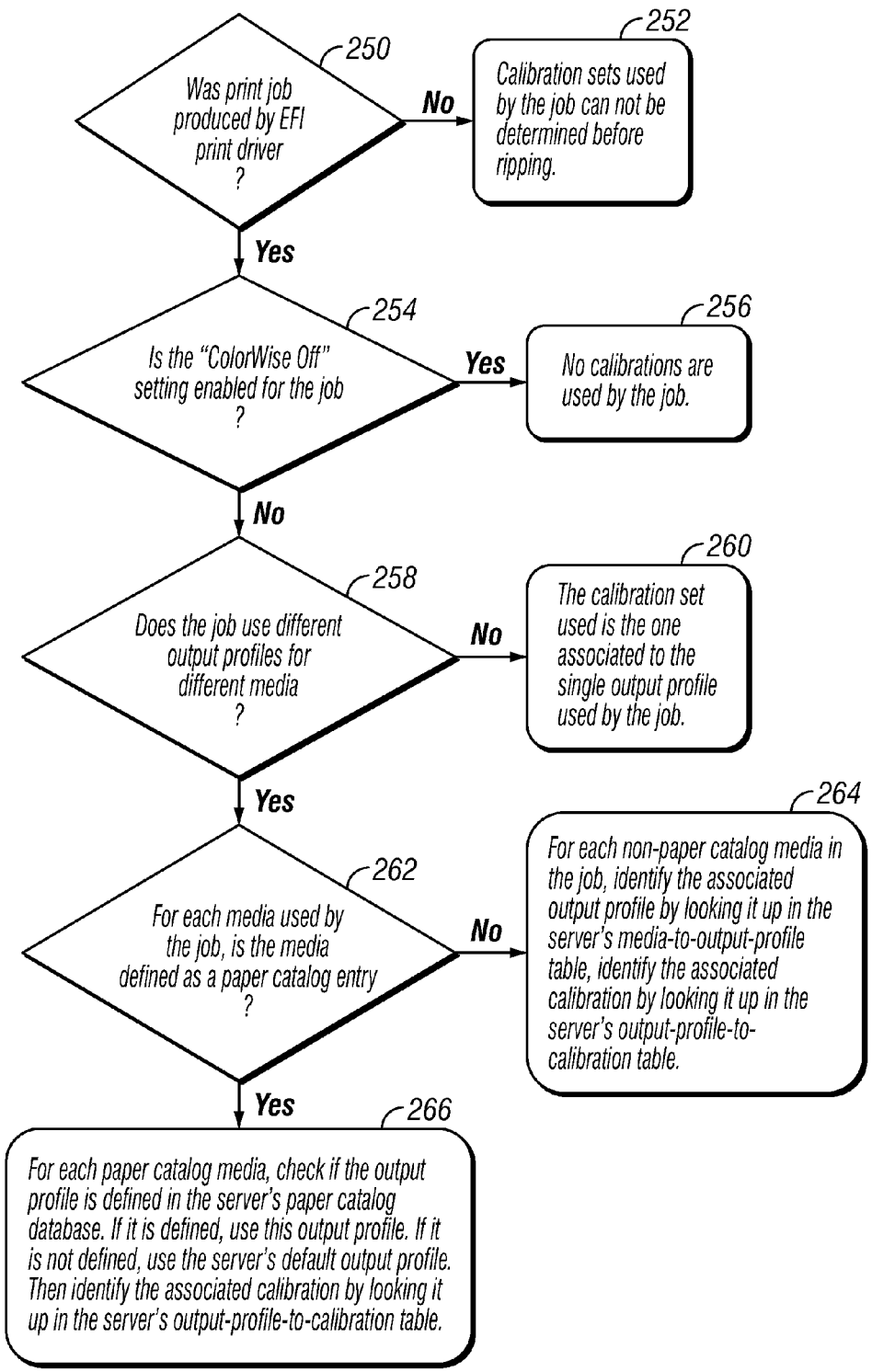
FIG. 2B is a flow diagram of a mapping algorithm for mapping print jobs to calibrations, according to an embodiment.

An embodiment can be understood with reference to FIG. 2B. FIG. 2B is a flow diagram of a mapping algorithm for mapping print jobs to calibrations, according to an embodiment. A processor determines whether the print job is a type of customized print job 250, such as but not limited by whether such print job was produced by a particular print driver, for example but not limited by, a print driver provided by EFI. When the processor determines the print job was not such particular type of customized print job, calibration sets used by the print job may not be determined before ripping 252. When the processor determines the print job was such particular type of customized print job, it is determined whether a particular setting, such as for example but not limited by the "ColorWise Off" setting by EFI, is enabled for the job 254. When the particular setting is enabled for the print job, then no calibrations are used by the job 256. Otherwise, when the particular setting is not enabled for the print job, then it is determined whether the print job uses different output profiles for different media 258. When it is determined that the print job does not use different output profiles for different media, then the calibration set used is the one associated with or mapped to the single output profile used by the job 260. When it is determined that the print job does use different output profiles for different media, then, for each media used by the print job, it is determined whether the media is defined as a paper catalog entry 262. When it is determined that the media is not defined as a paper catalog entry, then for each non-paper catalog media in the print job, a processor identifies the associated output profile by looking up such output profile in print server's 154 media-to-output-profile table and identifies the associated calibration by looking up such calibration in print server's 154 output-profile-to-calibration table 264. When it is determined that the media is defined as a paper catalog entry, then for each paper catalog media, a processor checks if the output profile is defined in print server's 154 paper catalog database. If such output profile is defined, it is determined to use such output profile. If such output profile is not defined, it is determine to use print server's 154 default output profile. The processor then identifies the associated calibration by looking up such calibration in print server's 154 output-profile-to-calibration table 266.

An example of print server 154 mapping the job ticket to calibrations in accordance with an embodiment is as follows. A particular 100-page job uses heavy card stock for the front and back covers, glossy coated paper for page 50, and plain paper for all other pages. The job ticket contains this information, whereas the job contains the content of what to print on each page. For this example, print server 154 has a total of six calibrations available: plain paper, glossy coated paper, heavy card stock, high quality paper, thick paper, and rough paper. This particular 100-page job may not use all six calibrations. Such job may only use the calibrations that correspond to the media used in the job. In this example, based on the media selections chosen for the job which are stored in the job ticket, print server 154 calculates that this 100-print job uses three calibrations: plain paper, glossy coated paper, and heavy card stock. When the job is to be printed at print engine 158, print server 154 uses the calibration data from these three calibrations.

Once print server 154 has determined the particular calibration to be used by the print engine 158 for the print job, the process requires a particular calibration sequence for each of the conditions that are used by the print job 208.

It should be appreciated that for the purposes of the discussion herein, the terms, conditions, parameters, and job ticket are related as follows: "print conditions" are any factors that affect how color appears on a print. A common variable is media type, e.g. plain paper, glossy paper, and heavy card stock. But there are other variables, such as the halftone screen, e.g. line screen, dot screen, error diffusion screen, and glossy mode (on or off, e.g. some print engines have the ability to slow down how quickly the media passes through the fuser, resulting in more fuser oil on the print, which gives more of a glossy look). Other possible factors are temperature, humidity, the type of toner in the print engine, as well as other factors known to those of skill in the art.

At any given time, a calibration contains the measurement data for one set of these print conditions. However, it is possible to get good results using one calibration on other print conditions as well. For example, perhaps a calibration using Hammermill 24 lb. paper can be used with Hammermill 32 lb. paper and still result in good color quality.

It should be appreciated that media type is a parameter in the job ticket and can be set to values such as, but not limited to, plain paper, glossy paper, coated paper, and card stock. For some print engines, halftone setting is another parameter in the job ticket and can be set to values such as, but not limited to, line screen, dot screen, and error diffusion screen. As well, the job ticket contains information desired to print the job, according to an embodiment. For example, print page 1 on heavy card stock, pages 2-100 on plain paper, use the line halftone screen for the entire job, and staple the pages in the upper left corner.

Once each of the conditions has been calibrated 208, the print job is ripped, as shown in step 210. For the purposes of discussion herein, the term "ripped" comes from the acronym "RIP" which stands for Raster Image Processor. A RIP receives input files, such as, but not limited to, PostScript files, PDF files, PCL files, and JPEG images, and creates rasters, which can be bitmaps or other forms of raster output. Thus, when a file is "ripped", the input file is processed by the RIP and rasters are created (one raster for each page or other portion of the print job portion to be printed).

In an embodiment, after the print job is ripped, print server 154 then sends the ripped print job to the print engine 158, as shown in step 212. After receiving the ripped print job, print engine 158 prints the print job with optimal color quality, as shown in step 214.

As mentioned above, print server 154 may need to determine which calibration, of one or more calibrations, to use for a particular print job. An example of a set of one or more calibrations is a first calibration for plain paper, a second calibration for heavy paper, and a third calibration for coated paper.

More particularly, suppose for example, that a job ticket for a particular print job contains a media type parameter with 50 different possible values. That is, suppose the job ticket for a particular 100-page job specifies to use extra heavy paper for the front and back covers, embossed coated paper for page 50, and recycled paper for all other pages. Also suppose that print server 154 has a total of six calibrations available: plain paper, glossy coated paper, heavy card stock, high quality paper, thick paper, and rough paper. It should be appreciated that none of the media type names used by this job match the calibration names. However, in an embodiment, print server 154 maps the set of parameters in the job ticket to the number of calibrations, however small (six, in this example).

An embodiment provides configuration tables in print server 154 that indicate how mapping is done. For the above example, print server 154 may map the "extra heavy paper" media type to the "thick paper" calibration, the "embossed coated paper" media type to the "glossy coated" calibration, and the "recycled paper" media type to the "plain paper" calibration.

Following is a list of example media types and halftone screens. Such list is illustrative only and is not meant to be limiting. It should be appreciated that not all print engines support all of such media types.

Some Media Types
Banner
Blue
Bond Paper
Carbonless
Cardstock
Cast Coated
Clear

Coated
Coated ExtraHeavy
Coated Heavy
Coated Prepunched
Cotton Paper
Embossed paper
Embossed Paper Cast Coated
Embossed Paper Coated
Embossed Prepunched Tab Stock
Embossed Tab Stock
Envelope
Extra Heavy Labels
Extra heavy tabstock
Extra Heavy
Fabric
Film
Fine
Full cut tab—Embossed
Full cut tab—Plain
Gloss Coated for Laser
Gloss Coated for Offset
Glossy
Goldenrod
Gray
Green
Heavy
Heavy Labels
Heavy Tabstock
High Quality
Interleaved
Ivory
Japanese Paper
Labels
Letterhead
Letterhead Heavy
Light Tabstock
Lightpaper
Ltcardstock
Matte Coated for Laser
Matte Coated for Offset
Mid Thick
Orange
Ordered/Sequenced—Embossed
Ordered/Sequenced—Plain
Pink
Plain
Plain Paper [Heavy]
Postcard
Postcard Cast Coated
Postcard Coated
Preprinted Cast Coated
Preprinted Coated
Prepunched Tab Stock
Pre-punched Transparency
Purple
Recycled
Red
Rough
Special
Tab Stock
Tack film
Textured Paper
Thin Paper
Tracing
Transfer Paper
Translucent
Transparency
Uncoated
Vellum
Vellum Paper
White
Yellow
Some Halftone Screens
150 Dot YMCK Rotated
200 Dot YMCK Rotated
300 Dot YMCK Rotated
600 Dot 90 deg Fixed
200 Line YMCK Rotated
300 Line 90 deg Fixed
600 Line 90 deg Fixed
Normal
Fine
Coarse
Very Fine
Very Coarse
Standard
Resolution
Gradation
Error Diffusion
Stochastic
Smooth FM
Line
Photo
Text Enhancement Calibration Sequence In an embodiment, after the appropriate calibration is determined by the mapping algorithm, for example as shown in FIG. 2B, for a particular job ticket, then a calibration sequence is conducted by print server 154 as follows. Print server 154 causes a calibration patch page to be printed. A calibration patch page is a page that contains color patches for each of print engine's 158 colorants. For example, such color patches may span the range of possible values (e.g. 0%-100% and, e.g. light to dark) for each individual colorant. For example, print server 154 may prompt the user to print the calibration patch page by displaying a message dialog on a computer display or on an engine's display panel. Or, the printer could automatically print the calibration patch page once the particular calibration(s) has(have) been determined, and so forth. Once the calibration patch page is printed, the patches are measured, e.g. by using spectrophotometer 160 or by using an associated copier's scanner (not shown). Such read or measured data may give an indication of the current state of the printer. The read data is compared to the stored data, which reflect a desired state of the printer at the time the output profile was created, and a mapping from the read data to the desired data is performed and applied to the raster data that are sent from print server 154 to the print engine 158.

Ripping and Tagging

In an embodiment, calibration values are determined for a particular print job when the job is ripped.

The result of the ripped process is that each page or other portion of the print job is tagged with information about how the print job is to be printed. For example, suppose the job ticket specified that page 1 is to be printed on heavy card stock and with the 200 dot halftone. Before sending the page 1 raster data to print engine 158, print server 154 sends a tag to indicate that the content of the print job should be printed on heavy card stock. Perhaps the various media types available on print engine 158 are specified by an 8-bit number (0-255). Perhaps heavy card stock corresponds to media type number 100. Thus, print server 154 sends a command to the printer or print engine 158 that includes a tag to print using media type number 100. For the halftone specification, perhaps the halftone is specified on a per pixel basis. In addition to a 32-bit CMYK value for each pixel (8-bits for each colorant C, M, Y, K), perhaps there are an additional 4 bits (0-15) that specify the halftone to use for each pixel. Perhaps 200 dot halftone corresponds to halftone number 7. Thus, for every CMYK pixel in the raster data, there is also another 4-bits of data specifying to use halftone number 7.

The second page of the job could indicate to use a different media type and different halftone. For example, the job ticket specifies that page 2 is to be printed on plain paper. Before sending the page 2 raster data to print engine 158, print server 154 sends a tag to indicate that such data should be printed on plain paper. Perhaps plain paper corresponds to media type number 33. Thus, print server 154 sends a command to the printer or print engine 158 that includes a tag to print using media type number 33. Suppose the job ticket specifies that the "300 line" halftone should be used on page 2. Perhaps the code for the "300 line" halftone is halftone number 4. So for every CMYK pixel in the raster data, there is also another 4-bits of data specifying to use halftone number 4.

User Point of View

Figure 3:
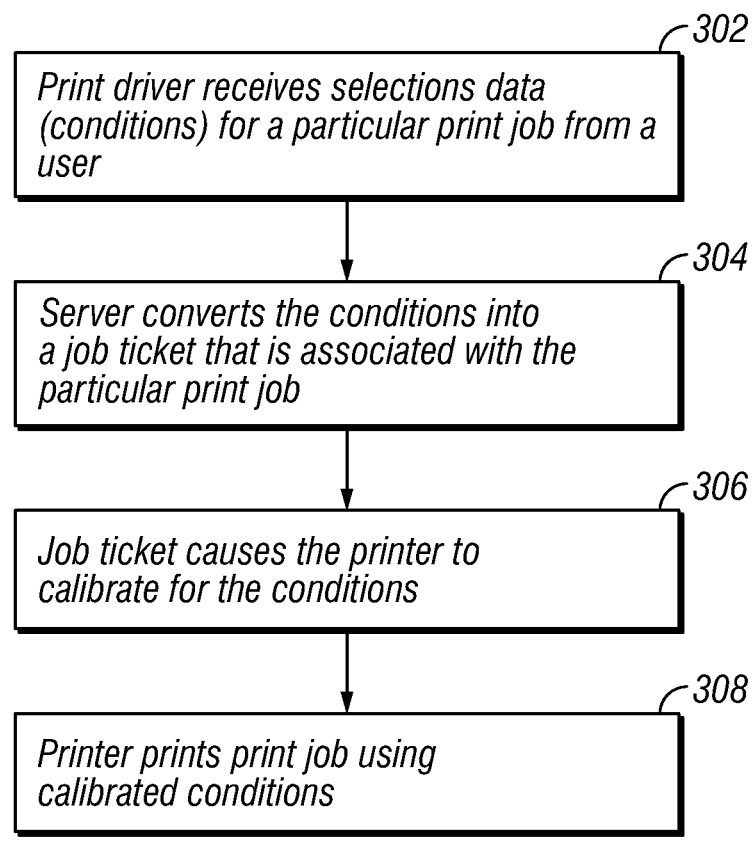
FIG. 3 is a flow diagram of a process flow for high-level job-based calibration, according to an embodiment.

A user point of view can be described with reference to the flow diagram of FIG. 3. From the user's point of view, the user makes selections for a print job using a print driver. For example, when the user desires to print the print job, according to an embodiment, the user is presented with a user selection to select particular conditions, such as media type, halftone, and the like. Thus, at this stage, the print driver receives selections data, i.e. conditions, for a particular print job from the user, as shown in step 302.

Thus, the data reflecting the conditions are sent to the next process step along with the content of the print job, itself. Specifically, the server converts the data reflecting the conditions into a job ticket associated with the print job, as shown in step 304. As another example, the job ticket contains data that reflects how the print job is to be printed, such as on thick paper, landscape, a particular type of dot, stapled, and so forth. Thus, the job ticket is separate and distinct from the content of the print job, itself.

Therefore, a job ticket can contain information which tells the printer to print the same content once on glossy paper and again on newsprint paper. Thus, according to an embodiment, different corrections and adjustments are applied to when the content is printed on glossy paper compared to the corrections and adjustment applied to when the same content is printed on the newsprint paper. Thus, the job ticket causes the printer to calibrate for the different conditions, as shown in step 306.

As a result, the printer prints the print job using the correct calibrated conditions to print with optimal color quality, as shown in step 308.

Calibration Guard

In an embodiment, the system allows the user to see the status of all of the calibrations on the system in terms of the time since the last calibration and the number of prints since the last calibration. In an embodiment, a user interface (UI) is provided that indicates which calibrations have expired. An example can be described with reference to FIG. 4, where FIG. 4 is a screen shot of a sample Calibrator window 700, according to an embodiment.

FIG. 4 shows 7 different calibrations (702a, 702b, 702c, 702d, 702e, 702f, and 702g). The headers are sortable. In the example, calibrations 702a-702g are sorted by Status 704. For example, the calibration 702a has a filled circle icon under Status header 704, which indicates that the current calibration is good. In contrast, calibration 702g shows an empty circle icon under Status header 704, which indicates that the current calibration is not good. Further, Calibrator also displays last used data under the Last used heading 706 and the date when the calibration was last performed under the Last calibrated heading 708. For example, calibration 702a was last used on 03/02/2009 2:15 PM 706 and was last calibrated on 03/02/2009 9:32 AM 708.

In an embodiment, when a media needs more than one setting configuration, a media group is created that may contain a name, job properties that were used to print a corresponding calibration set, reference color measurements for this calibration set, and when such set was created, last used and last calibrated. For example, in FIG. 4, Calibrator window 700 shows calibration 702f and 702g as belonging to a same media group 710, Xerox DC Select G. It should be appreciated that in an embodiment the first item in a media group is highlighted, such as for example as shown at calibration 702a in this screen. This first item is how the system will print by default on a specific media. The other calibration sets in the same group are variants, i.e. other ways of printing on this same media.

In an embodiment, media groups remain as a group. For example, when the default sort is by "Status", the entries in a particular media group remain together, regardless of their respectful statuses. As a particular example, in FIG. 4, calibrations 702f and 702g are shown to be displayed as a media group. As well, each media group has a default media and each media variation is displayed below the default media.

In an embodiment, when the user selects one or more jobs to be printed and the print job is about to use a calibration that has expired, then the system suspends the print job. The system notifies the user that a calibration needs to be performed. For example, FIG. 5 shows a screen shot of a sample notification message box, which notifies the user that printing the print job has been suspended, according to an embodiment. The calibration status of a job may be presented using words stating, for example but not limited to, since how long a calibration is outdated or when such calibration will be outdated. Such calibration status may also be presented using icons. When a job has been suspended, double clicking on the job discloses why it has been suspended, e.g. "calibration is outdated since . . . ". As well, the dialog message box allows the operator to print anyway or to launch client calibrator application 150 for this print job.

In an embodiment, the user is allowed to specify the conditions under which a calibration is considered expired, e.g. in terms of time since the last calibration and the number of prints since the last calibration. An example implementation of how a user may specify conditions under which a calibration is considered expired can be described with reference to FIG. 6. The first window in the upper left-hand corner allows a user to set calibration limits 602, but where the check box, "Enable calibration status?" is not checked. In contrast, the window directly below 606 shows the "Enable calibration status?" check box is checked. As well, window 606 shows that the following calibration limits were set: 24 hours 610 and 1000 impressions 612. Because calibration limits were set for window 606, Calibrator window 608 shows the status icon, e.g. a corresponding icon 614 that appears to be half full, and the age of the calibration, e.g. "Last calibrated 05/13/09 12:21 PM (2 days ago)" 616. Further, Calibrator window 608 shows a legend of icons that represent calibration states, accompanied by an explanation 618.

Legend 618 shows three icons. One icon 618a is full and has the description, "Less than half of time/Impression count has passed". The second icon 618b appears half full and has the description, "More than half of time/Impression count has passed". The third icon 618*c* is empty and has the description, "Time/Impression count has been reached or surpassed".

It should be appreciated that the calibration status is defined herein as the current state of the age of the last calibration measurement versus the defined limit of time or number of impressions specified by the user. In an embodiment, if the status represents more than one media and/or calibration, e.g. the status for a job that uses more than one calibration, the system uses the oldest value for representation.

It should be appreciated that in an embodiment, a user can choose whether the user wants to suspend printing when the printer exceeds the set limits. Similarly, the user can choose whether the user wants to be shown a warning when calibrating a print job that is within the set limits. Examples of ways a user can make both choices are shown in windows 602 and 606 as the bottom two check boxes.

When default setting for calibration is unchecked 602, then Calibrator window 604 is presented. The calibration information that calibrator window 604 displays are age 620 only, because no calibration limit ("null limits") has been set. In an embodiment, time is displayed as time elapsed.

In an embodiment, rules for display are as follows:
0-60 minutes: "n minute(s) ago"
1-24 hours: "n hour(s) ago"
1-7 days: "n day(s) ago"
8-365 days: "n week(s) ago"
366+ days: "n year(s) ago"

It should be appreciated that the above rules are by way of example only and are not meant to be limiting.

In an embodiment, the user is proactively warned that calibration should be performed when approaching expiration and when an engine is warmed up.

In an embodiment, once the system is setup to contain the user preferences regarding outdated calibration, the system is ready to monitor print jobs as they are submitted for printing. Examples of what constitute an outdated calibration may be a number of impressions and/or time elapsed. As well, such user preferences may include what to do when calibrations required by print jobs are outdated. For example, the system may suspend the particular print job or only provide a warning about the outdated calibration.

In an embodiment, before sending a print job to the printer, the system may verify the status of all calibration sets used by the print job. When at least one calibration is outdated, then the system may take the action specified in user preferences. For example, the system may do the following: suspended the print job until calibration is performed; cause a warning to be presented to the user, or allow the user to block or release the print job. As well, the user may also disable calibration status checking in order to let print jobs go through regardless of their calibration status.

Profile Advisor

In an embodiment, when the user encounters a new media type or print condition, the system informs the user whether a new profile and/or new calibration set needs to be created to get the optimal color quality. Thus, the user measures such new media type or print condition. As an example, the user measures such new media type with spectrophotometer 160 and a patch of samples is produced by the new print condition and the system.

After calibrating the new print condition, e.g. due to a different media type or halftone, the user prints a number of CMYK patches and then measures those with spectrophotometer 160. This colorimetric measurement data provides the reference measurements for the evaluated calibrated condition. Based on this data, the system then determines whether any of the current output color profiles may be used for this new print condition.

For example, in an embodiment, such colorimetric reference measurements of the evaluated calibrated condition are compared to the data contained in the ICC color profiles currently installed in the system. Color differences are calculated using industry standard "Delta-e". The output profile for which this comparison produces the smallest average color difference is retained. When the color difference for this output profile is smaller than the maximum acceptable color deviation as specified in a user preference, the user is advised to use this existing profile and to not create a new profile. When no existing profile produces an average color deviation smaller than the preference, the user is advised to create a new color output profile.

It should be appreciated that one skilled in the art may readily find information about profiles, including sample profiles, from the International Color Consortium (ICC) and need not be reproduced for the purposes of discussion herein.

Figure 7:
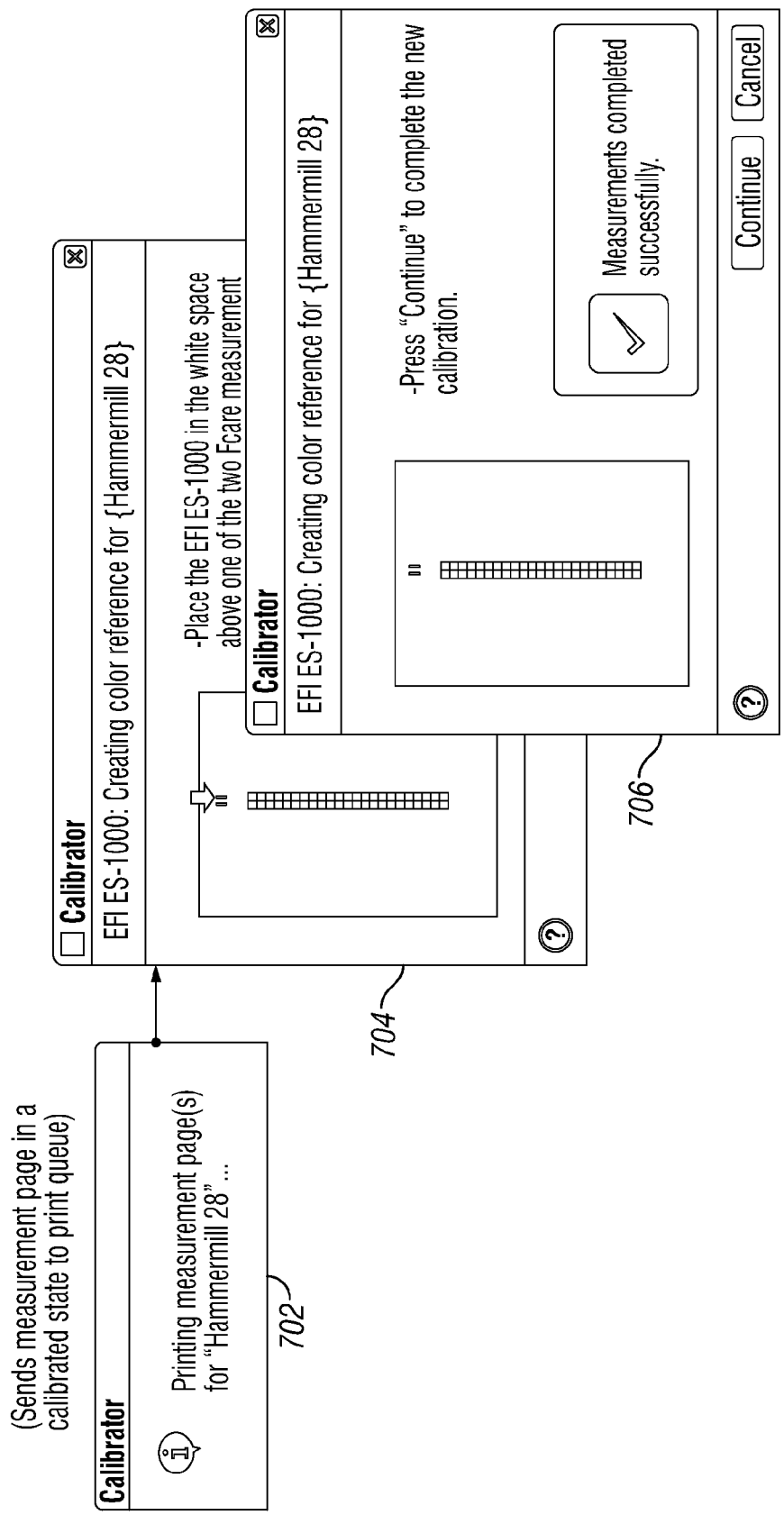
FIG. 7 is a schematic diagram showing a sequence of three screen shots for creating a new calibration according to an embodiment.

As example sequence of operations for creating a new calibration according to an embodiment can be understood with reference to FIG. 7. FIG. 7 is a schematic diagram showing a sequence of three screen shots for creating a new calibration according to an embodiment. The system causes a message box 702 to be displayed that informs the user that a measurement page(s) in a calibrated state is being sent to the print queue for Hammermill 28. In this example, "Hammermill 28" is the name that the user has chosen for the set of printing conditions he uses with the Hammermill 28 pound paper. The full set of printing conditions includes print options such as but not limited to halftone, glossy mode, and media type. Once these printing conditions have been input, the calibrated page is output, as illustrated by box 702.

In response to the measurement page being sent to the print queue, the system causes a Calibrator window 704 to be displayed for the user on which is a test strip on which a test strip is printed. The system then directs the user in measuring the test strip with spectrophotometer 160 to obtain the reference colorimetric measurements produced by the printing condition. After the measurements are completed, the system causes a subsequent Calibrator window 706 to be displayed which informs the user that the measurements are completed.

Figure 8:
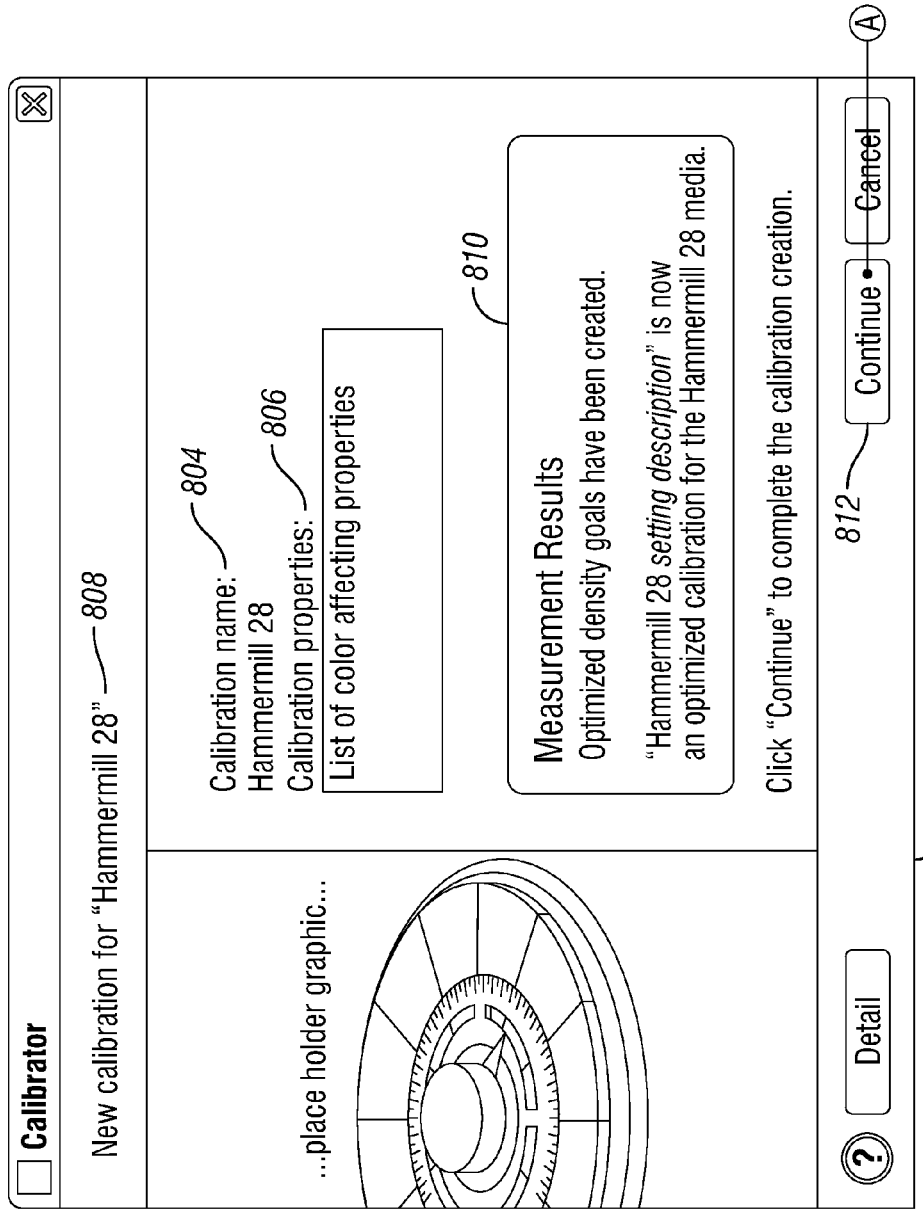
FIG. 8 shows a sequence of two screen shots for a particular example, according to an embodiment.

The result of adding a new calibration according to an embodiment can be described with reference to FIG. 8. FIG. 8 shows a sequence of two screen shots for a particular example. FIG. 8 shows a resulting Calibrator window 802 that contains information about the newly added calibration for the device and print conditions represented in FIG. 7 by the name "Hammermill 28". For example, Calibrator window 802 shows the calibration name 804 and the calibration properties 806 for a particular calibration, "Hammermill 28" 808. As well, measurement results 810 are displayed. In the example, measurement results 810 convey that the optimized density goals have been created. As well, measurement results 810 convey that the title, "Hammermill 28 setting description" is now an optimized calibration for the Hammermill 28 media.

Continuing with the example, after a user clicks the Continue button 812 on Calibrator window 802, the system opens a new Calibrator window 814 (or refreshes Calibrator window 802 with updated information). Calibrator window 814 presents information about the profile matching results 816. For example, the profile matching process described hereinabove may be used to produce such results. The results are summarized in this example by the maximum color difference between the best matching color profile and the reference measurements for the calibration. Other data may be displayed in this summary, such as, but not limited to, the average color matching. In this particular example, profile matching results 816 contain the following information: that Hammermill 28 is now an estimated profile for the Hammermill 28 media; that the expected accuracy of this profile is within a specified range, e.g. 10 Delta-E; that the result is within the calibrator preferences saved in the client calibrator application 150; and that the system is configured to create an optimized profile for the new media, e.g. Fiery® Color Profiler Suite may be used to create an optimized profile for "Hammermill 28". Thus, the user may accept the proposed profile by clicking OK for example, or create a new profile for the newly created calibrated condition (here Hammermill 28) using a standard color profiling package such as "Fiery® Color Profiler Suite".

An Example Machine Overview

In an embodiment, an example machine overview may include any computer system of any form or size, such as a wireless portable notebook or desktop computer that may be used to execute the logic steps of the invention. Also desired is a color measuring device such as a spectrophotometer or scanner, and a printer to produce the printed output to measure.

Figure 9:
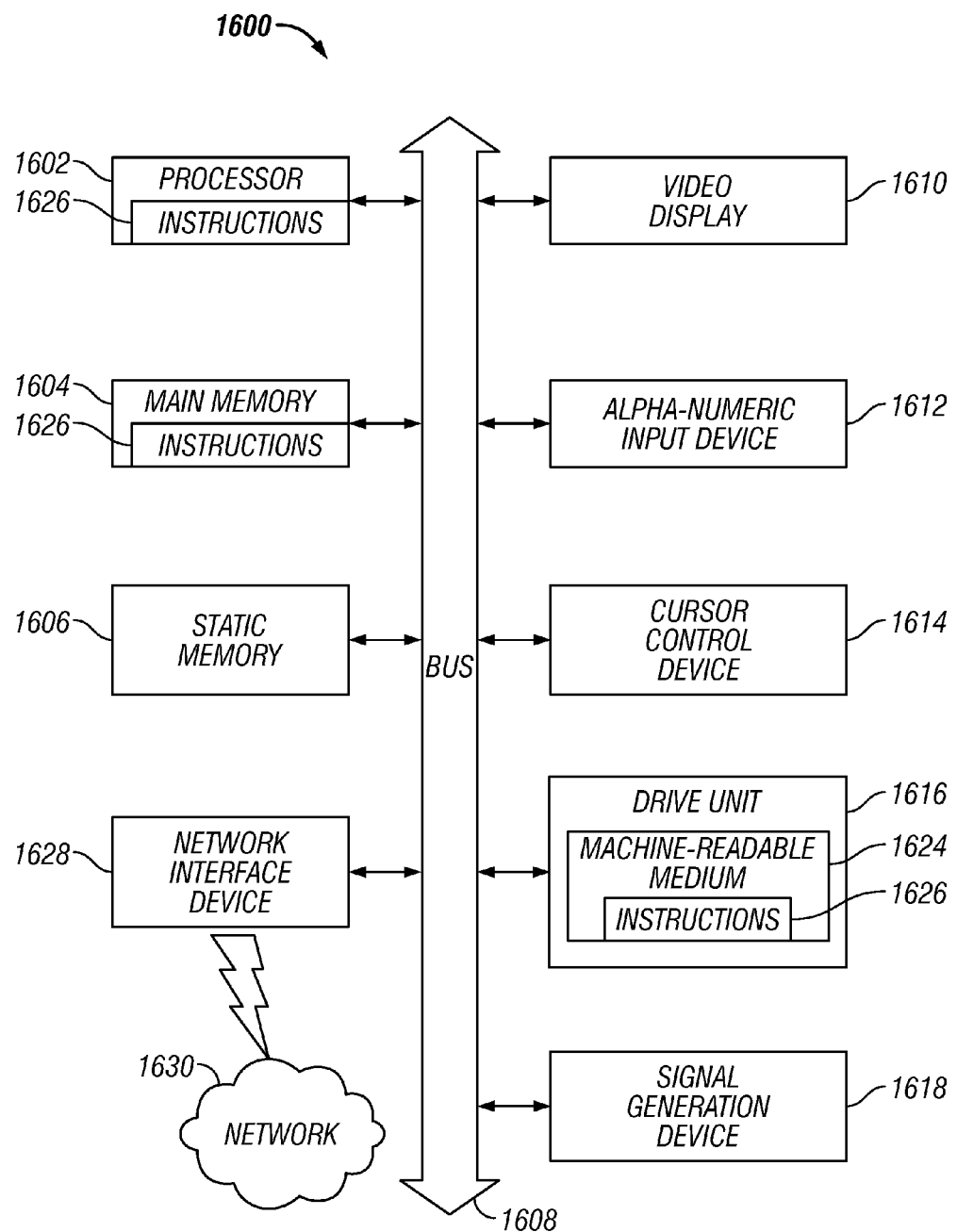
FIG. 9 is a block schematic diagram of a machine in the exemplary form of a computer system within which a set of instructions may be programmed to cause the machine to execute the logic steps of the invention.

Further, FIG. 9 is a block schematic diagram of a machine in the exemplary form of a computer system 1600 within which a set of instructions may be programmed to cause the machine to execute the logic steps of the invention. In alternative embodiments, the machine may comprise a network router, a network switch, a network bridge, personal digital assistant (PDA), a cellular telephone, a Web appliance or any machine capable of executing a sequence of instructions that specify actions to be taken by that machine.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker; and a network interface device 1628.

The disk drive unit 1616 includes a machine-readable medium 1624 on which is stored a set of executable instructions, i.e. software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complimentary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium may include read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

As will be understood by those familiar with the art, the invention may be embodied in other specific forms without departing from the spirit or essential characteristics thereof. Accordingly, the disclosure of the invention is intended to be illustrative, but not limiting, of the scope of the invention, which is set forth in the following Claims.

The invention claimed is:

1. A computer-implemented method for print job based calibration, comprising the steps of:
    receiving, at a server, a print job;
    receiving, at said server, parameters associated with the print job and generating a job ticket comprising said parameters;
    mapping, by a mapping processor at said server, said job ticket to any of: a particular calibration and a set of a plurality of calibrations;
    causing, by said server, a particular calibration sequence to be performed for each parameter in said job ticket and determining resulting calibration values;
    in response to determining resulting calibration values, said server performing a raster image process (rip) on the print job, using the resulting calibration values; and
    delivering the ripped print job to a print engine for printing;
    wherein when the print job is printed, the print job is printed with an intended color quality, and
    wherein said mapping comprises the steps of:
        determining, by a processor, whether the print lob uses different output profiles for different media;
        when it is determined that the print lob does not use different output profiles for different media, using a calibration set that is associated with or mapped to a single output profile used by said print job;
        when it is determined that the print lob does use different output profiles for different media, determining, by a processor, for each media used by the print job, whether the media is defined as a paper catalog entry;
        when it is determined that the media is not defined as a paper catalog entry, then for each non-paper catalog media in the print job, identifying, by a processor, an associated output profile by looking up a media-to-output-profile table at said server and identifying an associated calibration by looking up an output-profile-to-calibration table at said server; and
        when it is determined that the media is defined as a paper catalog entry, then for each paper catalog media, checking, by a processor, whether the output profile is defined in a paper catalog database at said server and when said output profile is defined, using said output profile and when said output profile is not defined, using a default output profile at said server, and identifying an associated calibration by looking up said output-profile-to-calibration table at said server.

2. The computer-implemented method of claim 1, wherein one or more settings that affect the mapping are:
media types specified to be used in the print job;
whether it is specified to use a single output profile or to use different output profiles for different media types in the print job;
whether a particular color processing indicator is turned off;
particular setting at said print server for associating calibration sets to output profiles;
whether the print job uses paper catalog entries as media types, and when said print job uses paper catalog entries as media types, determining whether any output profiles are specified for the paper catalog entries; and
other print job settings that affect calibration selection.

3. The computer-implemented method of claim 1,
prior to receiving said print job, providing to a user a print driver, said print driver comprising the steps of:
in response to a user indicating to print the print job, presenting to the user a selection of print conditions associated with the print job; and
receiving from said user, one or more selected print conditions from said presented selection of print conditions, said one or more selected print conditions representing said parameters associated with the print job.

4. An apparatus for print job based calibration, comprising:
a server;
at least one processor at said server; and
memory at said server to carry out the steps of:
receiving, at said server, a print job;
receiving, at said server, parameters associated with the print job and generating a job ticket comprising said parameters;
mapping, by a mapping processor at said server, said job ticket to any of:
a particular calibration and a set of a plurality of calibrations;
causing, by said server, a particular calibration sequence to be performed for each parameter in said job ticket and determining resulting calibration values;
in response to determining resulting calibration values, said server performing a raster image process (rip) on the print job, using the resulting calibration values; and
delivering the ripped print job to a print engine for printing;
wherein when the print job is printed with an intended color quality, and
wherein said mapping comprises the steps of:
determining, by a processor, whether the print job uses different output profiles for different media;
when it is determined that the print job does not use different output profiles for different media, using a calibration set that is associated with or mapped to a single output profile used by said print job;
when it is determined that the print job does use different output profiles for different media, determining, by a processor, for each media used by the print job, whether the media is defined as a paper catalog entry;
when it is determined that the media is not defined as a paper catalog entry, then for each non-paper catalog media in the print lob, identifying, by a processor, an associated output profile by looking up a media-to-output-profile table at said server and identifying an associated calibration by looking up an output-profile-to-calibration table at said server; and
when it is determined that the media is defined as a paper catalog entry, then for each paper catalog media, checking, by a processor, whether the output profile is defined in a paper catalog database at said server and when said output profile is defined, using said output profile and when said output profile is not defined, using a default output profile at said server, and identifying an associated calibration by looking up said output-profile-to-calibration table at said server.

* * * * *